United States Patent
Nishikawa et al.

(10) Patent No.: US 6,280,562 B1
(45) Date of Patent: Aug. 28, 2001

(54) CONTACT ADHERING METHOD

(75) Inventors: Nobuyoshi Nishikawa, Satte; Eiichi Okuno, Tochigi-ken; Toshiharu Horie, Ibaragi-ken; Zyunzo Makino, Ohmiya; Hiroshi Aoki, Ohmiya, all of (JP)

(73) Assignee: Cemedine Company, LTD, Tokyo (JP)

( * ) Notice: Subject to any disclaimer, the term of this patent is extended or adjusted under 35 U.S.C. 154(b) by 0 days.

(21) Appl. No.: 08/200,554

(22) Filed: Feb. 22, 1994

Related U.S. Application Data

(63) Continuation of application No. 07/964,696, filed on Oct. 22, 1992, now abandoned, which is a continuation-in-part of application No. 07/653,327, filed on Feb. 11, 1991, now abandoned.

(30) Foreign Application Priority Data

Feb. 13, 1990 (JP) .................................................. 2-31954
Sep. 27, 1990 (JP) ................................................ 2-258433

(51) Int. Cl.[7] ...................................................... C09J 5/02
(52) U.S. Cl. ................................. 156/307.3; 156/307.5; 156/308.8; 156/329; 156/330; 156/331.4; 156/331.7; 427/208.4; 427/341; 428/350
(58) Field of Search ............................. 156/307.3, 307.5, 156/308.8, 331.4, 331.7, 329, 330; 427/208.4, 341; 428/350

(56) References Cited

U.S. PATENT DOCUMENTS

| | | | |
|---|---|---|---|
| 3,496,119 | * | 2/1970 | Weller et al. ........................ 156/330 |
| 3,971,751 | | 7/1976 | Isayama et al. ...................... 260/37 |
| 4,242,157 | * | 12/1980 | Gehle ................................... 156/329 |
| 4,257,932 | * | 3/1981 | Beers .................................... 156/329 |
| 4,529,749 | * | 7/1985 | Favre et al. ......................... 524/588 |
| 4,539,345 | * | 9/1985 | Hansen ................................ 156/329 |
| 4,748,166 | * | 5/1988 | Gautier et al. ..................... 524/588 |

FOREIGN PATENT DOCUMENTS

| | | |
|---|---|---|
| B-53399/86 | 8/1986 | (AU) . |
| 0293733 | 12/1988 | (EP) . |
| 50-156599 | 12/1975 | (JP) . |
| 52-73998 | 6/1977 | (JP) . |
| 55-137129 | 10/1980 | (JP) . |
| 58-10418 | 2/1983 | (JP) . |
| 60-228516 | 11/1985 | (JP) . |
| 62-230822 | 10/1987 | (JP) . |
| 63-12677 | 1/1988 | (JP) . |
| 63-112642 | 5/1988 | (JP) . |
| 63-291918 | 11/1988 | (JP) . |
| 1-131271 | 5/1989 | (JP) . |

* cited by examiner

*Primary Examiner*—John J. Gallagher
(74) *Attorney, Agent, or Firm*—Arent Fox Kintner Plotkin & Kahn, PLLC

(57) ABSTRACT

A contact adhering method comprising the steps of:

(1) applying a layer of a moisture curable adhesive to at least one of two adherends;

(2) maintaning the two adherends in non-contact with each other for a period of time until the surface of the layer of moisture curable adhesive develops tack as a result of exposure to atmospheric moisture; and (3) bringing the two adherends into contact with each other in a tack range.

9 Claims, No Drawings

CONTACT ADHERING METHOD

CROSS-REFERENCE TO RELATED APPLICATION

This application is a continuation of application Ser. No. 07/964,696 filed Oct. 22, 1992 (now abandoned), which is a continuation-in part of application Ser. No. 07/653,327, filed Feb. 11, 1991 (now abandoned).

BACKGROUND OF THE INVENTION

1. Field of the Invention

This invention relates to a contact adhering method, in which adherends are fastened by means of an adhesive which does not contain any solvent and can be cured without any heating process.

2. Description of the Related Art

Conventional solvent-based elastomeric adhesives (rubber cement) are easy to use to fasten adherends, since these adhesives do not require that adherends be temporarily kept pressed until they are firmly fastened, and since it is possible to let a certain period of time (open time) pass before the adherends must be fastened. However, such elastomeric adhesives include solvents as indispensable components, which are toxic to man and are flammable.

Various efforts and research have been carried out to solve the above inconveniences of the conventional solvent elastomeric adhesives through such alternatives as (1) high solidification, (2) non-use of solvents, and (3) use of aqueous contact (aqueous emulsion type) adhesives. However, these alternatives are not satisfactory for the following reasons.

(1) When it is highly solidified to remove the solvent, the adhesive cannot maintain its effective adhesiveness. (2) Use of hot melt adhesives is conceivable in place of the solvent adhesives. The hot melt adhesives are easy to use, but should be heated and are difficult to apply to large adherends. (3) Aqueous adhesives are safe from the viewpoint of hygiene and non-flammability, but have low contact adhesiveness. The aqueous adhesives are applicable only to water-absorbing adherends such as wood, and take time to dry.

With a conventional adhering method using a moisture curable type adhesive, the adhesive is applied on a single one (single spread) or both (double spread) of the adherends, and the adherends are fastened to cure the adhesive. In such a case the adhesive is slow to cure. Even when the adhesive is applied to adherends having a good moisture permeability, it will take one or two days for adhesive to cure at room temperature. In addition, the adherends have to be temporarily fastened by some means. This means the adhering task is very troublesome. When fastening adherends having no moisture permeability such as steel sheets, the adhesive takes time to cure, which makes the task even more troublesome.

SUMMARY OF THE INVENTION

The present inventors have focused on the fact that a moisture curable adhesive reacts with moisture at room temperature, cures to produce a thin film, and develops tack as the thin film is produced. They have tried to use the tack of the adhesive, thereby solving the problems experienced with conventional adhering methods.

It is therefore an object of this invention to provide a novel contact adhering method and an adhesive to be used for the proposed method. According to this invention, the adhesive is not a health hazard or a fire hazard since it does not include any solvent. The adhesive is of a contact type, which enables adherends to be fastened soon after the adhesive is applied. No temporary fastening means is necessary after the adherends are fastened with the adhesive, which facilitates the adhering task. In addition, the adhesive is applicable to any adherend since it is not of an aqueous contact type (aqueous emulsion type). The adhesive is cured at room temperature and does not need any heating. In contrast to the conventional moisture curable adhesives, the adhesive of this invention is applicable to adherends which do not have any moisture permeability, and may be fastened by themselves in a short period of time.

The above object of this invention is accomplished by the contact adhering method comprising the steps of applying a moisture curable adhesive to adherends, leaving the adhesive and the adherends for a certain period of time (open time) until tack is formed, and fastening the adherends in a tack range.

DETAILED DESCRIPTION

According to the method of this invention, the adhesive layer reacts with moisture in air or moisture supplied forcibly, and develops tack while forming a thin film on the surface. When the adhesive layer is too thick, the resulting thin film cannot be formed uniformly, which will cause insufficient tack and lower the contact adhesiveness of the adhesive.

The word "tack" is defined in this specification as a tacky state wherein there is maintained the contact adhesiveness which enables adherends to be fastened soon after bringing the adherends into contact with each other and produces excellent adhesiveness in a period of time after the contact of the adherends.

The term "tack range" is defined in this specification as a time required for developed tack to vanish.

The moisture curable adhesive may be one or more adhesives selected from the group consisting of (a) a silicon adhesive and/or an organic polymer adhesive comprising a high polymer (A) having one or more reactive silicon groups in a molecule, (b) a urethane adhesive comprising a high polymer (B) having one or more isocyanate groups in a molecule, and (c) an epoxy adhesive having the said high polymer (A) and/or (B) and a compound including an epoxy group.

An example of the high polymer, especially polyoxyalkylene (A) having one or more reactive silicon groups in a molecule is disclosed in Japanese Patent Publications No.156599/1975 (U.S. Pat. No. 3,971,751) and No.73998/1977, and Japanese Patent Publication No.10418/1983. Japanese Patent Laid-Open Publication No.230822/1987 discloses another high polymer. Japanese Patent Laid-Open Publication No.12677/1988 discloses an organic silicon compound having in a molecule two or more silicon atoms in which a hydrolyzable group is combined. An adhesive compound of oxyalkylene polymer including silicon groups, and acrylate and/or methacrylate (co)polymer including silicon groups are disclosed in Japanese Patent Laid-Open Publication Nos. 228516/1985 (U.S. Pat. No. 4,618,656), 112642/1988 (EP 0265929) and 131271/1989 (U.S. Pat. No. 4,910,255).

The adhesive comprising the compound disclosed in Japanese Patent Laid-Open Publication No.112642/1988 (EP 0265929) has a good adhesive property (such as tack range). The cited Japanese Publication No.112642/1988 (EP 0265929) discloses a curing compound, which is composed of (1) a copolymer including a reactive silicon group whose molecular chain substantially consists of (i) alkylacrylate and/or alkylmethacrylate monomeric unit having an alkyl group with 1 to 8 carbons, and (ii) alkylacrylate and/or alkylmethacrylate monomeric unit having an alkyl group with 10 more carbons, and (2) a polymer substantially consisting of oxyalkylene including a reactive silicon group. Here the reactive silicon group represents a functional group including silicon which can form cross linking through siloxane linkage. A typical example of the reactive silicon group is expressed by the general formula (I):

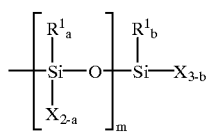

(I)

where $R^1$ represents a substituted or unsubstituted monovalent organic group having 1 to 20 carbons, or a triorganosiloxy group; X is a hydroxyl group, or a heterogeneous or homogeneous hydrolyzable group; a is an integer which is 0, 1, or 2; b is an integer which is 0, 1, 2, or 3 (a and b cannot have simultaneously the values a=2 and b=3) and m is an integer from 0 to 18. A preferable reactive and functional silicon group is expressed by;

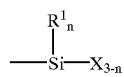

(II)

where $R^1$ is the same as in formula (I), and n is integer of 0, 1 or 2.

In order to make the adhering method of this invention more effective, the following compounds may be added to the foregoing adhesives (a) to (c). They are vinyl compounds such as a vinyl chloride (co)polymer, phenol resin compound, petroleum resin, terpene phenol resin, a tackifiers such as a rosin ester resin, preliminary reacted epoxy resin as exemplified in Japanese Patent Laid-Open Publication No.291918/1988, or acrylate and/or methacrylate compounds such as butylacrylate copolymers.

The adhesive for the proposed method is obtained by mixing 100 parts of any one of the above-mentioned compounds with 0.1 to 10 parts of an accelerator.

The accelerator may be any one of organic tin compounds, acidic phosphates, products of the reaction of acidic phosphates with amines, saturated or unsaturated polycarboxylic acid or acid anhydrides thereof, and organic titanate compounds.

Examples of the organic tin compounds are dibutyltin dilaurate, dioctyltin dimaleate, dibutyltin phthalate, primary tin octylate, dibutyltin methoxide, dibutyltin diacetylacetate, and dibutyltin diversatate.

Examples of the organic titanate compounds are titanates such as tetrabutyl titanate, tetraisopropyl titanate, and triethanolamine titanate.

If necessary, the adhesive usually contain as additives diluents (phthalate plasticizers such as dioctyl phthalate, butylbenzyl phthalate, plasticizers such as epoxydated soybean oil, solvents such as methanol, ethanol, and toludene, reactive diluents, etc), fillers (heavy calcium carbonate, light calcium carbonate and gluey calcium carbonate, kaolin, talc, silica, titanium oxide, aluminum silicate, magnesium oxide, zinc oxide, and carbon black, etc.), tackfiers (silane coupling agents such as amino-silane, epoxy-silane, etc.), drip-preventing agents, coloring agents, and antiseptics.

One of the adhesives to be used in this invention is a special type epoxy adhesive which is; composed of the above mentioned adhesives, epoxy resins such as bisphenol A glycidylether and the curing agents thereof.

When it is a moisture curable adhesive including modified silicon compounds, especially polyoxyalkylene having reactive silicon group, the adhesive is good in tack formation and storage stability, and hence is very effective for the purpose of this invention.

The adhesive is preferably of a one-part type, but also may be of a two-part type.

The adhesive can be applied to one or both of the adherends similarly to the conventional contact elastomeric adhesives. According to the method of this invention, the adhesive is very effective when it is applied either to only one adherend or both adherends.

The adhesive may be applied by conventional method such as by hand, spatulas, rollers or sprays.

The adhesive can be heated or moistened so as to increase tack and accelerate curing.

The tack is formed while the adhesive layer reacts with the moisture in the air and form a thin film. Therefore if it is applied too thickly, the adhesive cannot develop a sufficient degree of tack (tackiness), and has poor contact ability. It is therefore preferable that the adhesive be applied in the thickness of approximately 1 mm or less so as to increase the tack.

According to the adhering method of this invention, the adhering task can be easily carried out by using an adhesive which does not include any solvent and is positively cured by using the moisture in the air. In addition, although the adhesive is of the moisture curable type, the adherends can be fastened in a short period of time at room temperature, which has been very difficult to accomplish with conventional moisture curable adhesives.

EXAMPLES

Examples of the adhesives applicable to the method according to the inventions are given hereinafter.

Synthesis Examples 1 to 5

Acrylate and methacrylate polymers were made according to Synthesis Examples 1 and 5 disclosed in Japanese Patent Laid-Open Publication No.112642/1988 (EP 0265929).

TABLE 1

| Synethesis Example No. | 1 | 2 | 3 | 4 | 5 |
| --- | --- | --- | --- | --- | --- |
| Monomer component (parts) | | | | | |
| Butylacrylate | 63.5 | 445 | 9.5 | 7.4 | 66.6 |
| Methylmethacrylate | 389 | 23 | 457 | 447 | 400 |
| Stearil-methacrylate*1 | 117 | 119 | — | 117 | 118 |
| ACRYESTER SL*2 | — | — | 117 | — | — |
| Trimethylol propane trimethacrylate | — | 18.2 | — | — | 6.0 |
| TSMA*3 | 30.5 | 3.0 | 14.7 | 29.1 | KBH502*6 14.7 |
| Hercaptosilane*4 | — | 11.2 | 12.5 | 12.0 | KBH802*7 18.0 |

TABLE 1-continued

| Synethesis Example No. | 1 | 2 | 3 | 4 | 5 |
|---|---|---|---|---|---|
| AIBN*5 | 12.0 | 8.0 | 43.2 | 30.0 | 6.0 |
| Xylene | 255 | 110 | 262 | 257 | 257 |
| Copoymer (A) | | | | | |
| Number average molecular weight (Mn)*8 | 9,700 | 9,000 | 2,400 | 3,700 | 4,500 |
| Molecular weight distribution (Mv/Mn)*8 | 1.9 | 3.4 | 2.0 | 1.2 | 1.2 |
| Polymerization conversion (%) | 99 | 99 | 98 | 100 | 98 |
| Resin solid content (%) | 70 | 85 | 70 | 70 | 70 |

Remarks:
*1: ACRYESTER S by Mitsubishi Rayon Co., Ltd.
*2: Alkylmethacrylate mixed with $C_{12}$ and $C_{13}$ by Mitsubishi Rayon Co., Ltd.
*3: γ-methcryloxy propyl trimethoxysilane
*4: γ-mercaptopropyl trimethoxysilane
*5: Azobisisobutylonitrile
*6: γ-methacryloxy propylmethyl dimethoxysilane
*7: Mercaptopropyl methyldimethoxy silane
*8: Meaured according to GPC.

Synthesis Examples 6 and 7

According to Synthesis Examples 8 and 9 of Japanese Patent Laid-Open Publication No.112642/1988 (EP 0265929), polyoxypropylene having the following group at the molecular end was made.

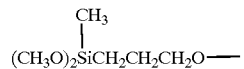

Examples 1 to 8 and Comparative Example 1

The adhesive was prepared by mixing the compounds shown in Table 2, and was thinly applied on plywood test pieces. Under conditions of ambient temperature of 20° C. and relative humidity of 65%, the following items were examined: the period of time required for tack to form, and tack intensity. The test pieces were fastened in five minutes after the adhesive became tacky, and were left as they were all day long. Then the fixability of the test pieces was checked. The results of the test are shown in Table 3.

Results substantially the same as those in Examples 2 and 3 were obtained when the polymers of Synthesis Examples 2 to 5 were used instead of the polymer for Synthesis Example 1.

TABLE 2

| | Adhesive components | | | | |
|---|---|---|---|---|---|
| Additives | A | B | C | D | E |
| *1 | 100 | — | — | — | — |
| *2 | — | 100 | — | — | — |
| *3 | — | — | 100 | — | — |
| *4 | — | — | — | 100 | — |
| *5 | — | — | — | — | 100 |
| *6 | 2 | 2 | 2 | 2 | 2 |
| *7 | — | 6 | 6 | — | — |
| *8 | — | — | 50 | — | — |

Remarks:
*1: The polymer in Synthesis Example 6
*2: Compound made of the polymers in Synthesis Examples 1 and 6
*3: Compound made of the polymers in Synthesis Examples 1 and 7
*4: SILYL 5825 (a trade name of Kanegafuchi Chemical Ind., Co., a modified silicon compound having silyl goups at the molecular chain terminals of a main chain of polypropylene oxide)
*5: TAKENATE L1003 (a trade name of Takeda Yakuhin Co., Ltd., polypropylene oxide having isocyanate groups at the molecular chain terminals)
*6: Dibutylin oxide solution dissolved in equimolar dioctylphthalate
*7: N- β-(aminoethyl) amylpropyl trimethoxy silane
*8: HAKUENKA CCR (a trade name of Shiraishi Kogyo Kaisha, Ltd., surface-treated calcium carbonate)

TABLE 3

| Example | Adhesive component | Applied to | Odor | Tack formation | Fixability | Adhesiveness | Tack Range |
|---|---|---|---|---|---|---|---|
| 1 | A | 2 sides | ○ | 27 min | ◉ | ○ | 10 min |
| 2 | B | " | ○ | 26 min | ◉ | ○ | 50 min |
| 3 | C | " | ○ | 24 min | ◉ | ○ | 50 min |
| 4 | D | " | ○ | 26 min | Δ | ○ | 5 min |
| 5 | E | " | ○ | 25 min | ○ | ○ | 15 min |
| 6 | *F | " | ○ | 32 min | Δ | ○ | 10 min |
| 7 | C | 1 side | ○ | 24 min | ◉ | ○ | 20 min |
| 8 | C | " | ○ | 24 min | ◉ | ○ | 20 min |
| Comparative Example 1 | *G | 2 sides | X | 10 min | ◉ | ○ | 20 min |

Remarks:
*F: EP · 001 (a trade name of CEMEDINE CO. LTD., an elastomeric epoxy adhesive of 2 part type)
*G: #575 (a trade name of CEMEDINE CO., LTD., a solvent type chloroprene rubber adhesive)
Solvent odor:
○: none
X: odorous
Tack formation: time required for tack to form checked by finger touch
Tack intensity:
◉: strong tack equivalent to that of #575
○: tack a little weaker than that of #575
Δ: tack much weaker than that of #575
Adhesiveness: ○: Not easy to peel off the fastened adherends by hand
Tack range: time required for the formed tack to vanish In each example, it was easy for the adhesive to fasten the adherends because the adhesive was free from solvent and could offer contact adhering. The adhesive had good adhesiveness after a one day curing period.

Examples 9 to 12 and Comparative Examples 2 and 3

The adhesive composed of the compounds B and C shown in Table 2 and the solvent elastomeric adhesive #575 were applied on a mild steel plate with a thickness of 0.5 mm as room temperature of 20° C. and relative humidity of 65%. The test pieces were fastened in 20 minutes after the adhesive formed tack. The test pieces were checked in terms of the fixability immediately after they were fastened. Then the test pieces were left for one day, and were checked in terms of the adhesiveness. In addition, the test pieces were fastened by a method which is usually used for a conventional moisture cure adhesive. To be more specific, the adhesive made of the compound C was applied to a mild steel plate as test pieces. The test pieces were fastened with the adhesive having a thickness of 1 mm. The test pieces were checked in terms of the fixability and the adhesiveness after being left for one day. The results are shown in Table 4.

TABLE 4

| | Adhesive component | Applied to | Odor | Fixability | Adhesiveness |
|---|---|---|---|---|---|
| Example | | | | | |
| 9 | B | 2 sides | ○ | ○ | ○ |
| 10 | C | 2 sides | ○ | ○ | ○ |
| 11 | B | 1 side | ○ | ○ | ○ |
| 12 | C | 1 side | ○ | ○ | ○ |
| Comparative Example | | | | | |
| 2 | * G | 2 sides | X | ○ | ○ |
| 3 | C | 1 side | ○ | X | X |

Remarks:
* G: # 575 (a trade mark of CEMEDINE CO. LTD., a solvent type chloroprene rubber adhesive)
Solvent odor: ○: None
X: Odorous
Fixability: ○: Not easy to move the fastened adherends by hand
X: Not fixed even after being fastened 2 hours (the adhesive was not cured)
Adhesiveness: ○: Not easy to separate the fastened adherends by hand
X: Easy to separate the fastened adherends by hand (the adhesive was hardly cured)

In each Example, the adhesives were free from solvent odor and showed excellent contact ability and fixability to those of elastomeric adhesives. The adherends could be easily fastened without the use of a fixing tool due to the excellent adhesiveness. In addition, the adherends were fixed so that they were movable immediately after they were fastened with the adhesive. Although the adhesive is of the moisture curable type, adhesiveness of the fastened adherends was good even after the adherends were left as they were for a day at the temperature of 20° C. The adhesive of Comparative Example 2 emitted a strong solvent odor. In Comparative Example 3 of a conventional adhering method, the adhesive had contact ability and required a long time to be cured, and cured poorly after a one day curing period.

What is claimed is:

1. A contact adhering method comprising the steps of:

(a) applying a layer of a solvent-free moisture curable adhesive comprising:
polyoxyalkylene including one or more reactive silicon groups in a molecule,
to at least one of two adherends;

(b) maintaining the two adherends in non-contact with each other for a period of time beginning upon the application of the layer of moisture curable adhesive, and extending until the surface of the layer of moisture curable adhesive begins curing and develops tack as a result of exposure to atmospheric moisture;

(c) bringing the two adherends into contact with each other while the surface of the layer of moisture curable adhesive is tacky; and (d) permitting the moisture curable adhesive to be cured in the absence of heat treatment, thereby adhering said adherends.

2. The contact adhering method according to claim 1, wherein the thickness of the layer(s) of the moisture curable adhesive is 1 mm or less.

3. The contact adhering method according to claim 1 or 2, wherein said moisture curable adhesive is composed of (1) a copolymer including a reactive silicon group whose molecular chain substantially consists of (i) alkylacrylate and/or alkylmethacrylate monomeric unit having an alkyl group with 1 to 8 carbons, and (ii) alkylacrylate and/or alkylmethacrylate monomeric unit having an alkyl group with 10 or more carbons, and (2) a polymer substantially consisting of oxyalkylene including a reactive silicon group.

4. The contact adhering method according to claim 1 or 2 wherein said reactive silicon groups are represented by the following general formulae (I) and/or (II):

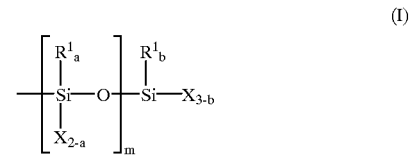

wherein $R^1$ represents a substituted or unsubstituted monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; an m is an integer of 0 to 18;

wherein $R^1$ is as defined in formula (I) and n is an integer of 0, 1 or 2.

5. The contact adhering method according to claim 3 wherein said reactive silicon groups are represented by the following general formulae (I) and/or (II):

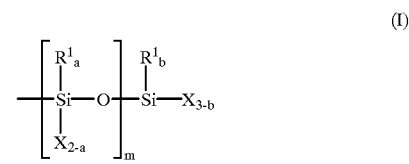

wherein $R^1$ represents a substituted or unsubstituted monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; an m is an integer of 0 to 18;

wherein $R^1$ is as defined in formula (I) and n is an integer of 0, 1 or 2.

6. A contact adhering method comprising the steps of:

(a) applying a layer of a solvent-free moisture curable adhesive to at least one of two adherends, said adhesive comprising polyoxyalkylene including one or more reactive silicon groups in a molecule;

(b) maintaining the two adherends in non-contact with each other for a period of time beginning upon the application of the layer of moisture curable adhesive, and extending for a period of time of 24–32 minutes until the surface of the layer of moisture curable adhesive begins curing and develops tack as a result of exposure to atmospheric moisture;

(c) bringing the two adherends into contact with each other 5–50 minutes after completion of step (b), while the surface of the layer of moisture curable adhesive is tacky; and (d) permitting the moisture curable adhesive to be cured in the absence of heat treatment, thereby adhering said adherends.

7. The contact adhering method according to claim 6, wherein the thickness of the layer(s) of the moisture curable adhesive is 1 mm or less.

8. The contact adhering method according to claim 7, wherein said moisture curable adhesive is composed of (1) a copolymer including a reactive silicon group whose molecular chain substantially consists of (i) alkylacrylate and/or alkylmethacrylate monomeric unit having an alkyl group with 1 to 8 carbons, and (ii) alkylacrylate and/or alkylmethacrylate monomeric unit having an alkyl group with 10 or more carbons, and (2) a polymer substantially consisting of oxyalkylene including a reactive silicon group.

9. The contact adhering method according to claim 7, wherein said reactive silicon groups are represented by the following general formulae (I) and/or (II):

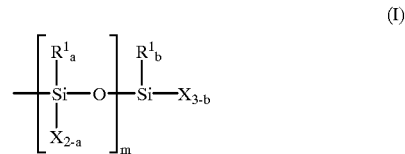

wherein $R^1$ represents a substituted or unsubstituted monovalent organic group having 1 to 20 carbon atoms, or a triorganosiloxy group; x represents a hydroxyl group or a heterogeneous or homogeneous hydrolyzable group; a is an integer of 0, 1 or 2; b is an integer of 0, 1, 2 or 3, provided that a is not 2 when b is 3; and m is an integer of 0 to 18;

wherein $R^1$ is as defined in formula (I) and n is an integer of 0, 1 or 2.

* * * * *